Dec. 1, 1942.　　　　　B. C. PLACE　　　　　2,303,706

FASTENER

Filed April 17, 1939

Inventor
Bion C. Place

By Strauch & Hoffman
Attorneys

Patented Dec. 1, 1942

2,303,706

UNITED STATES PATENT OFFICE 2,303,706

FASTENER

Bion C. Place, Detroit, Mich., assignor of one-half to George E. Gagnier, Detroit, Mich.

Application April 17, 1939, Serial No. 268,387

1 Claim. (Cl. 189—88)

The present invention relates to spring stud fasteners constructed from sheet metal. More particularly, the invention involves a sheet metal fastener having a resilience in its stud part comparable to the resilience obtainable in a spring stud fastener constructed from wire.

Spring fasteners heretofore proposed are being widely used to successfully attach trim panels, moldings, wires, cables, conduits and the like to parts of automobile or similar bodies. Fasteners of this type are either constructed by bending a piece of wire into appropriate form, or from sheet metal by stamping a fastener blank from a sheet of metal and then bringing the fastener to the desired form. Wire fasteners, as heretofore constructed, have generally been regarded as superior to sheet metal fasteners because the stud part of the fastener may readily be brought into a form in which it is effective to hold the supported part in snug engagement with the supporting structure, regardless of manufacturing variations in the supporting and supported structure. This characteristic of wire spring stud fasteners is in large measure due to the fact that wire inherently possesses greater resilience than is obtainable in fastener portions made from sheet metal.

The primary purpose of the present invention is to provide a sheet metal spring stud fastener having a stud part so constructed that a portion of the stud part provides a primary resilience to said part and other independently movable and flexible portions thereof contribute a secondary resilience to said part.

Still another object of the invention is to provide an improved sheet metal fastener constructed from an elongated strip of sheet metal of uniform width from end to end from part of which the head part of the fastener is formed and from the remainder of which the stud part thereof is made, and in which portions of the stud part are separated from other portions thereof to permit independent movement of the separated portions with respect to the remainder of the stud part which is in itself resilient and yieldable.

A still further object of the invention is to provide a sheet metal fastener the stud part of which consists only of two legs providing a certain degree of resilience to said part, and in which portions of the legs are struck therefrom to provide separately functioning elements contributing their own inherent resilience to the resilience of the stud part considered as a whole.

A still further object of the invention is to provide an improved sheet metal fastener including independently movable shoulder carrying elements formed as a part of the two legs constituting a part of the stud portion of the fastener in which the shoulders provided on the shoulder carrying elements are inclined with respect to lines parallel to a plane bisecting the stud of the fastener longitudinally whereby the fastener is effective to wedge the supported and the supporting parts together after it has been engaged in an aperture in the supporting structure.

A still further object of the invention is to provide an improved sheet metal fastener especially designed for securing hollow moldings or the like against a support in a manner to draw and maintain the moldings in snug engagement with the support by virtue of the unusual resilience possessed by the stud part of the fastener.

A still further object of the invention is to provide a highly resilient sheet metal fastener of a form capable of being cut without waste from sheet metal, and of being formed in a number of sizes from the same mating dies and in a number of shapes by simple and inexpensive variation of said dies.

This invention also aims to provide a sheet metal molding fastener capable of being produced without waste of metal and having a molding engaging part of such form that said part can be inexpensively adapted to moldings of varying heights and shapes.

Still further objects of the invention will appear as the description thereof proceeds with reference to the accompanying drawing, in which.

Like reference characters indicate like parts throughout the several figures.

Figure 1:
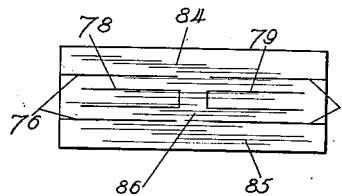
Figure 1 is a plan view of a blank from which a form of sheet metal fastener including the present invention may be constructed.

Referring to Figure 1, a fastener blank is disclosed consisting of a rectangular piece of metal having a pair of parallel incisions 76 cut in from one end of the blank, and another pair of like incisions 77 extending inwardly from the other end thereof. In addition, U-shaped incisions 78 and 79 provide shoulder bearing elements.

Figure 2:
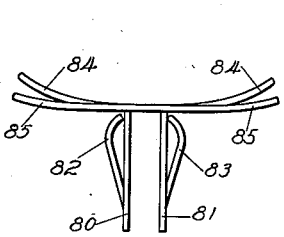
Figure 2 is a side elevational view of a fastener made from the blank of Figure 1.

The fastener of Figure 2 is formed from the blank of Figure 1 by bending the portion of the blank between the lines 76 and the lines 77 out of the plane of the blanks to provide legs 80 and 81 constituting a part of the stud part of the fastener. The parts of the blank separated from the body by the U-shaped incisions 78 and 79 are bent as illustrated to provide the shoulder bearing elements 82 and 83. The shoulders on elements 82 and 83 are relatively sharply inclined or disposed at an acute angle with respect to a line parallel to a plane bisecting the stud part of the fastener, whereby said elements exert a force wedging the supported and supporting structures into firm contact with each other. The effectiveness of this action is due to the fact that the stud part of the fastener is provided with a primary resilience in the connection between the legs 80 and 81 and a secondary resilience due to the inherent resilience of the elements 82 and 83 that are struck from said legs. The remainder of the blank is used to form the head part of the fastener consisting of two elongated portions 84 and 85 connected by a narrow portion 86. The elongated portions 84 and 85 may be curved longitudinally to a degree dependent upon the height of the molding above the flanges upon which said portions are intended to rest as hereinafter pointed out, in connection with Figures 4 to 7 which show how the fastener constructed from the blank of Figure 1 is preferably used.

Figure 3:
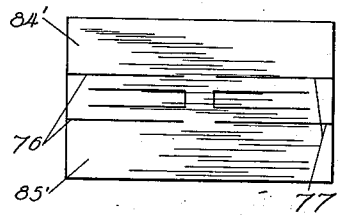
Figure 3 is a modified form of blank illustrating the range of fasteners which may be constructed by simple modification of a single die.
Figure 4:
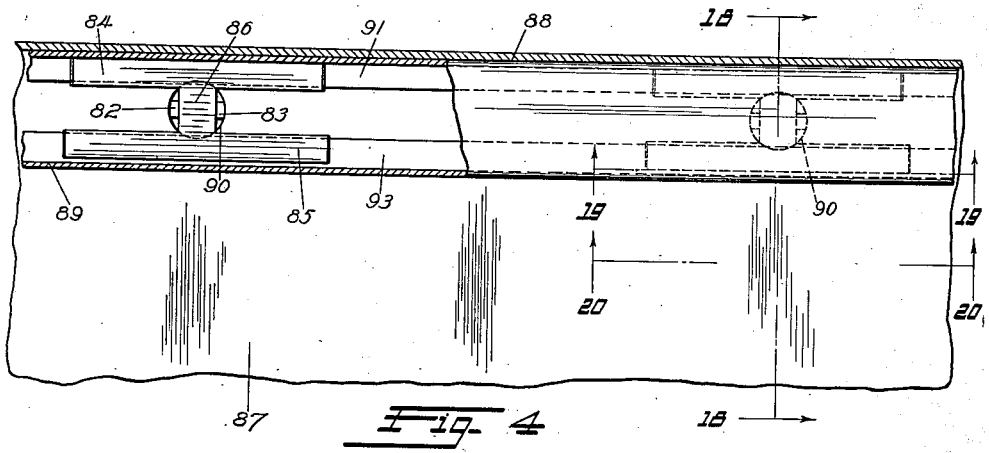
Figure 4 is a fragmentary plan view, a portion of the molding being broken away, illustrating how the fastener of Figure 2 may be utilized in securing a corner molding in place.
Figure 6:
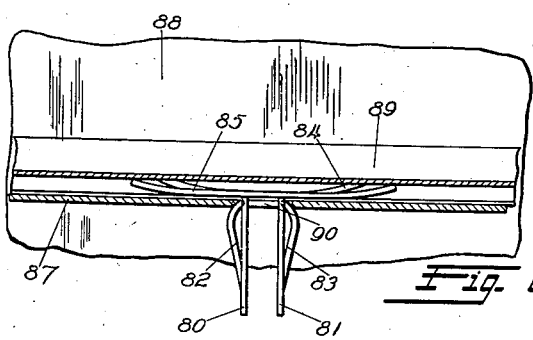
Figure 6 is a sectional view taken on the plane indicated by the line 19—19 in Figure 4.
Figure 5:
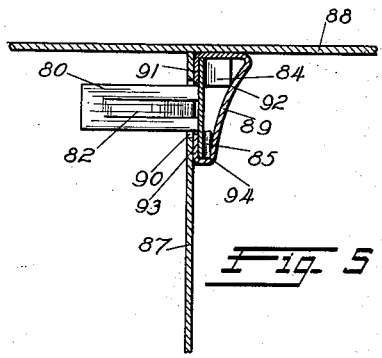
Figure 5 is a sectional view taken on the plane indicated by the line 18—18 in Figure 4 looking in the direction of the arrows.
Figure 7:
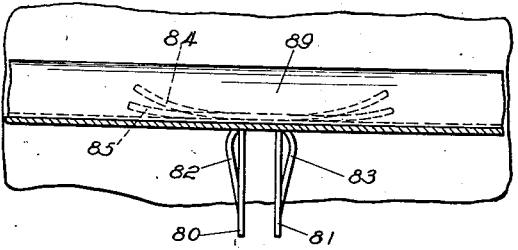
Figure 7 is a sectional view taken on the plane indicated by the line 20—20 in Figure 4 looking in the direction of the arrows.

It will be readily understood that there is no waste of metal in the formation of a fastener from a blank such as illustrated in Figure 1. There is also no waste when a fastener is constructed from such a blank as is illustrated in Figure 3, which is like that of Figure 1 except that the elongated portions 84' and 85' of the head part are materially wider than the corresponding portions of the blank of Figure 1. Inasmuch as the incisions in the blank of Figure 3 are exactly the same as in Figure 1 it will be understood that the same dies may be used to form the blank for a fastener having wider elongated portions and that it can be used to form fasteners having elongated portions of greater or less width within reasonable limits than illustrated in Figures 1 and 3. Fasteners of varying width in the head part may readily be constructed from the dies by varying the point at which the blank is separated from the body of the strip of metal from which the blanks are cut in succession, such severing being accomplished by merely cutting the strips transversely at the proper points.

It is intended that, as already stated, the elongated portion be curved more or less depending upon the spacing of the wall above the flange in which the body of each of said portions rests, and that the curvature be such as to insure firm, resilient contact between each elongated portion of the head part and a flange and the overlying wall. When fasteners such as illustrated in Figures 1 and 3 or those constructed from like blanks involving no waste material are utilized, employing the same dies to form the parallel and U-shaped incisions, it is only necessary to vary the dies which shape the elongated portions in accordance with the height of the molding. By simple and inexpensive changes in the dies it will, accordingly, be readily understood that a wide variety of molding fasteners both as to the width of the fastener, and as to the height of the head part or parts, may be constructed thus minimizing the cost of production of the present types of sheet metal fastener.

The mode of use of such a fastener as is illustrated in Figure 2 is made clear from Figures 4, 5, 6, and 7, in which 87 and 88 illustrate a supporting structure, and a wall disposed at right angles thereto respectively, said structure and wall providing a corner in which a molding 89, having a greater height in the corner provided between said wall and structure than at the other edge of the molding is secured. The supporting structure 87 is provided with an aperture 90 to receive the stud part of the fastener in the manner already described.

Before said stud part is entered in the aperture, the fasteners are assembled with respect to the molding by sliding them in from the end of the molding to the proper position along the length thereof in a manner well understood in the art, the curved elongated portions of the head being compressed more or less as may be necessary in entering the head part in the hollow molding, the elongated portion 84 bearing against the flange 91 of the molding and the wall opposite at the point 92 while the elongated portion 85 bears against the flange 93 and the wall opposite at a point 94. The width of the head part corresponds to the internal width of the molding immediately adjacent the flanges 91 and 93. Accordingly, when the fastener is in position in the molding it can not move in any direction except bodily lengthwise of the molding in order to bring it to the desired position. After the stud part has been entered in the aperture 90 the stud part draws the molding into firm yielding contact with the outside of the supporting structure 77 for the reasons already stated.

Of course, if the molding is wider than illustrated, the head part of the fastener will be made wider; and if it is higher, the curvature will be increased; and if of less height, the curvature in the elongated portions will be diminished, as will be obvious to a person skilled in the art.

Of course, the fastener may be used in securing moldings having a symmetrical form in which event it will be apparent that the curvature in both elongated portions of the head part will be the same.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In combination, a supporting structure having an aperture therein, a hollow flanged molding overlying said aperture, and a sheet metal fastener securing said molding to said structure, said fastener comprising a head part having a flat central portion extending over said aperture and resting on the flanges of said molding, and end head portions curved upwardly from said flanges into contact with the inside of the top wall of said molding, and a stud part depending from said flat central portion and extending through said aperture, said stud part consisting in two spaced straight legs unconnected except by said central portion, and tongues separated from said legs except adjacent the ends thereof remote from said central portion, said tongues being bent out of the planes of said legs and then curved inwardly toward each other providing inclined holding shoulders bearing against the corner provided by the intersection of the wall of said aperture with the under surface of said supporting structure.

BION C. PLACE.